United States Patent Office 2,978,250
Patented Apr. 4, 1961

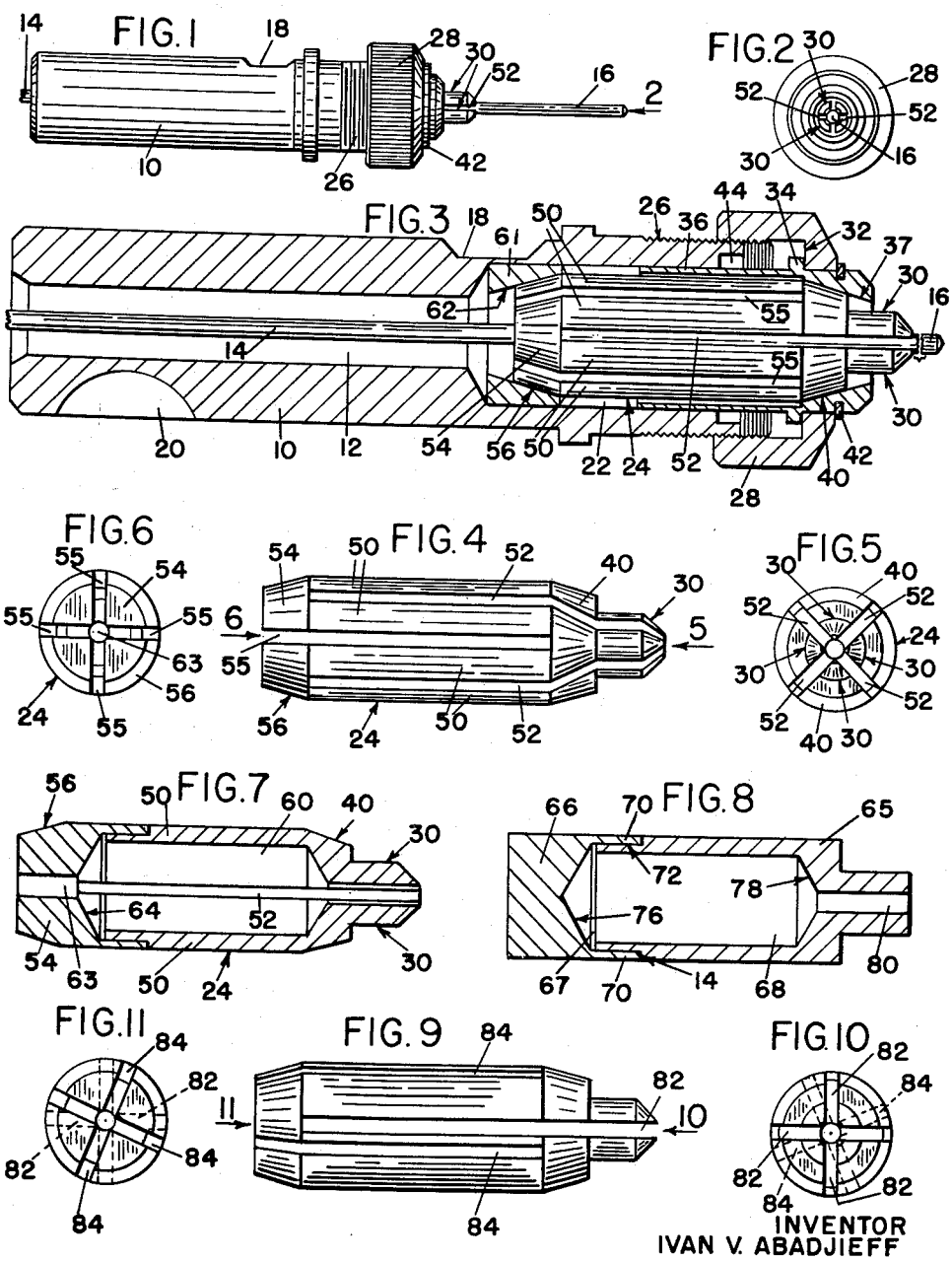

2,978,250
MAKING COLLETS

Ivan V. Abadjieff, Worcester, Mass., assignor to Leland-Gifford Company, Worcester, Mass., a corporation of Massachusetts Original application Nov. 13, 1958, Ser. No. 773,615. Divided and this application Aug. 27, 1959, Ser. No. 836,437

3 Claims. (Cl. 279—48)

This is a division of my prior application Serial No. 773,615, filed November 13, 1958, and relates to a new and improved collet and to the art of making the same, and the principal object of the present invention is to provide a new collet which has increased flexibility in a set of spring fingers to accurately and firmly grip drills or the like, even of the smallest sizes, and at the same time providing a collet having such spring fingers with a column strength sufficient to prevent collapse of the collet.

The ordinary chuck used to hold small drills, as for instance in drill presses and the like, has a construction making it very difficult to accurately apply and hold small drills. The drill-holding fingers in the chuck must be ordinarily adjusted several times in order to make sure that the drill is in the center of the chuck; and even when the drill is correctly and accurately located in the prior art chuck, it has considerable inaccuracy, called "runout." The minimum runout in the prior art is .005 inch, which means that the accuracy of the drill is greatly reduced merely by the chuck-holding means for holding the drill in the drill press. Many chucks have a greater runout than the minimum, but in any event commercial chucks for this purpose cannot be held down to any more accuracy in holding the drill than the aforesaid .005 inch.

In the present case, the construction provides a runout inaccuracy on the order of .001–.002 inch, a great improvement over the prior art.

The difficulty in making collets of the class described arises from the necessity of providing a collet in the required dimensions, i.e., small enough for average use, but which at the same time has drill-holding means such as spring fingers for strongly gripping the drill, and wherein said spring fingers are resilient enough for the purpose and at the same time provide strength enough to prevent collapsing or crushing of the collet either in use or while being changed in the collet holder, etc.

In the present case, this is accomplished by the provision of a novel method which essentially embodies the formation of the collet in two separate parts, each of which is drilled or bored centrally thereof to form a relatively enlarged chamber, the two parts being correctly tapered at the inside surfaces thereof for proper reception of the drill and then being secured together as for instance by a silver solder, and thereafter being cut to form the spring fingers, tempered to the springiness desired, etc.; and the provision of a collet made as above stated and including the provision of a collet made as above stated and including the provision of the same in a metal which is hardened and tempered at temperatures no higher than 1400° F. after the two parts as aforesaid have been silver soldered together at a temperature of 1600° F., so that the tempering and drawing failed to affect the joint between the two parts in any degree, it being understood that one of the requisites of the collet is that the fingers will be spring tempered to such a degree so that they will not take a set in closed condition but will always in and of themselves spring outwardly to open condition upon release of the means squeezing them together to hold the drill or other article.

Other objects of the invention include the provision of symmetrical cuts made in the assembled two-part member and also as an alternative the use of asymmetrical cuts which tend to increase the springiness to the fingers; and the provision of a separate taper ring which is provided and which is used as a base for, or center for, grinding certain of the outside surfaces thereof, resulting in great accuracy in the manufacture of the collet and in the chuck in which it is held, and in other aspects of the invention which will be made more clear hereinafter.

The invention further relates to arrangements and combinations of parts which will be hereinafter described and more particularly set forth in the appended claims.

Reference is to be had to the accompanying drawings, in which:

Fig. 1 is a view in elevation illustrating a drill chuck assembly;

Fig. 2 is an end view, looking in the direction of arrow 2 in Fig. 1;

Fig. 3 is an enlarged longitudinal section showing the collet in drill-holding position;

Fig. 4 is a view in elevation of the collet;

Figs. 5 and 6 are elevational end views of the collet, looking in the directions of the arrows 5 and 6 respectively in Fig. 4;

Fig. 7 is a sectional view of the collet;

Fig. 8 is a sectional view illustrating a step in the process of making the collet;

Fig. 9 shows a modification of the collet; and

Figs. 10 and 11 are end views thereof, looking in the direction of the respective arrows in Fig. 9.

Referring now to Fig. 1, there is shown a hollow cylinder 10 which forms the main body and support of the chuck assembly. This body is provided with a central longitudinal chamber 12 which receives the drill 14 or other member to be held; the entire device is substantially open from end-to-end thereof so that the drill point may project as at 16 in order to do the work and at the same time if a long drill is used, it may project to the rear of the chuck body.

The chuck body 10 may be provided with appropriate keyways 18 and 20 as usual to aid in holding the same in the drill spindle, and is provided with an enlarged chamber as at 22 (see Fig. 3) for holding the collet itself which is generally indicated by the reference numeral 24. The exterior of the cylindrical body 10 may be threaded at one end as at 26 for the reception of a nut 28, this nut providing the pressure used for clamping the spring fingers which are generally indicated by the reference numeral 30. These fingers, in other words, are squeezed radially together by the agency of the nut 28 in order to secure the drill 14 in working position.

In order to apply the pressure by means of nut 28, the same is provided with an annular interior shoulder portion 32 adapted to bear upon an external annular flange or ring 34 provided upon a cylindrical bushing 36 which is very thin walled. This bushing is provided also with an interior taper surface in the form of a cone (see 37 in Fig. 3), so that when nut 28 is turned, it moves relatively to the left in Fig. 3, carrying bushing 36 with it. The taper surface 37 is therefore relatively moved to the left and acts upon the tapered conical surface at 40, this surface being on the spring fingers and causing a radial inward squeezing action thereof, so that at their free ends at 30, they will move inwardly to grip the drill. A ring 42 may be in-set into the exterior surface of the bushing at the exposed portion thereof after the nut is positioned, in order to cause bushing 36 to move both inwardly and outwardly with the nut 28. At the interior thereof, the cylindrical body 10 is provided with an annular groove 44 into which flange 34 may run if necessary if the nut carries the same to that extent.

The collet itself is best shown in Figs. 4 to 7 and essentially it comprises a set of four fingers which terminate in the ends 30. The fingers which terminate in the free ends 30 are indicated in Figs. 2, 4 and 7 at 50, and it will be seen that these fingers are separated by slots 52 and are therefore substantially free and independent of each other except that they are connected at the rear end of the collet as indicated at 54. There are four slots 52 shown (see Fig. 5) although of course this is not a limiting number.

However, the fingers 50 themselves are bi-sected by a series of four slots 55 located at a 45° angle with respect to slots 52, and all of the slots 52 and 55 extend longitudinally of the collet. Slots 52 extend inwardly from the forward end, i.e., the right-hand end in Figs. 4 and 7, to a point adjacent to but not fully at the opposite end; and the slots 55 extend oppositely in the other direction as clearly shown in Figs. 3 and 4, and to the same degree. This construction provides for great flexiblity on the part of the fingers so that they may be squeezed together relatively easily.

At the rear end 54 of the collet, i.e., the left-hand end in Figs. 4 and 7, there is provided a conical or tapering surface 56 and this is reversed with respect to the similar surface 40. The interior of the collet is hollowed out as shown at 60 and therefore it will be seen that the fingers themselves are very thin, although the collet is essentially a one-piece member.

The tapered surface at 37 on bushing 36 engages tapered surface 40, and this results in the action of squeezing members 30 in Fig. 3 to grip the drill by means of the nut 28 as above described, and the taper 56 at the rear or left-hand end of the collet engages a unitary tapered ring 61 having an accurate internal taper at 62, so that the collet is accurately aligned in member 10 and the center thereof which holds the drill is accurately centered. Also, of course, the collet is drilled and reamed as at 63 in order to allow the drill to pass therethrough, and of course the drill will find the center of hole 63 due to the conical nature of the interior thereof indicated at 64 in Fig. 7.

In the use of the device, the collets may be interchanged with those having different sizes of reamed center holes for different sizes of drills, but the outside dimensions will all be the same, so that they will all fit in the bushing 36. This bushing is extremely accurately ground to fit the inside of the enlarged chamber at 22 in member 10, and it is believed that the operation of this collet will be apparent from the above description.

In order to make the collet, however, it has been found that it may be provided in two parts as shown in Fig. 8. These parts are indicated as the forward part at 65 and the rearward part at 66. These parts are individually drilled and reamed to form enlarged hollow chambers as at 67 and 68 and the part 66 is reduced as at 70 so that these parts then accurately abut each other at 72 on annual abutment path. By using silver solder at 1600° F., a perfect joint may be formed, and the solder runs throughout the joint so that the parts are therefore joined together completely.

All interior surfaces were finished prior to joining of the two parts 65 and 66, and the tapers as at 76 and 78 in particular were formed previous to the joining of the parts together, as well as the drilled hole at 80.

After the parts have been joined by silver soldering as above described, the slots 52 and 55 are milled or sawed and the tapers as at 56 and 40 are provided as well as the external taper at the ends 30 of the fingers 50. The parts are all accurately ground and then the entire collet is drawn at 1475° F. and tempered at 600° F. to provide the strength and resiliency required as to the spring fingers. It will be seen that this operation does not act in any way to harm the silver soldered joint at 72 because of the fact that this solder is applied at a temperature of 1600° F.

By providing the collet as above stated, the spring fingers 50 are rendered sufficiently flexible in order to provide a good clamping action even by the manual action of the operator in turning the nut, but of course a nut may be provided adapted to be turned by a wrench if desired. The fingers in addition to giving the required resiliency, will not take a set and operate under continued flexing for locking the drill in place and in releasing the same, and at the same time the fingers are strong enough so that enough column strength is provided to resist crushing or distortion thereof under conditions of use or even abuse.

As shown in Figs. 9 to 11, the slots 52 and 55 need not be symmetrically arranged but may be asymmetrically arranged as indicated at 82 and 84, and this action provides for even greater flexibility of the fingers than in the invention as shown in Figs. 3 and 4, but the manufacture and use of the collet of Figs. 9 and 10 are the same as heretofore described although the fingers are more easily actuated by the nut in this case.

Having thus described my invention and the advantages thereof, I do not wish to be limited to the details herein disclosed, otherwise than as set forth in the claims, but what I claim is:

1. A collet for a chuck, said collet comprising a first member, said member being elongated and hollow and having an open end, a reduced portion at the other end, a second member secured to the first member and closing the open end thereof, said members having similar outside diameters and being complementary, the reduced portion having an axial hole from the hollow interior of the combined members to the extreme tip of the reduced portion, the second member having a hole therethrough, said holes being aligned and the hollow in the combined members having an interior diameter greatly in excess of that of said holes, and longitudinal slots in the collet forming flexible resilient gripping fingers in said combined members.

2. A collet for a chuck, said collet comprising a hollow body having a hole extending axially therethrough from end-to-end thereof, a series of slots extending from adjacent one end completely through the other end of the body, and another set of slots extending from said one end to a point adjacent the said other end of the body, said slots forming flexible resilient gripping fingers, and tapered surfaces within said chamber at opposite ends thereof, said tapered surfaces being in the form of cones, said axial holes intersecting the apexes of the cones, said slots intersecting the chamber.

3. A collet for a chuck, said collet comprising a hollow body having a hole extending axially therethrough from end-to-end thereof, a series of slots extending from adjacent one end completely through the other end of the body, and another set of slots extending from said one end to a point adjacent the said other end of the body, said slots forming flexible resilient gripping fingers, and tapered surfaces within said chamber at opposite ends thereof, said tapered surfaces being in the form of cones, said axial holes intersecting the apexes of the cones, said slots intersecting the chamber, certain of said slots being located in a symmetrical arrangement with respect to each other, and another set of slots being arranged asymmetrically.

References Cited in the file of this patent

UNITED STATES PATENTS 2,755,094    Benjamin _____ July 17, 1956

FOREIGN PATENTS 529,002    France _____ Aug. 30, 1921

OTHER REFERENCES

American Machinist, July 21, 1921, vol. 55, No. 3, page 111.